United States Patent Office 3,557,037
Patented Jan. 19, 1971

3,557,037
RHEOLOGICAL PROPERTY-MODIFIED PARTICLE SUSPENSIONS IN ORGANIC LIQUIDS
George W. Collins, 605 Mountain Road, Kinnelon, N.J. 07405, and Frank A. Baron, 735 Jefferson Ave., Elizabeth, N.J. 07201
No Drawing. Filed Dec. 23, 1966, Ser. No. 604,190
Int. Cl. C08g 51/22, 51/28, 53/18
U.S. Cl. 260—29.1                 3 Claims

ABSTRACT OF THE DISCLOSURE

The rheological properties of particle suspensions in organic liquids, such as pigment suspensions for paints, are modified by incorporating in the suspension as a rheological property modifying agent a copolymer of ethylene and an unsaturated organic acid, the copolymer containing free carboxyl groups and having an acid number of between about 2 and 75, a molecular weight of between about 1,000 and 8,000, a softening point of between 205 and 240° F. and a penetration hardness of between about 1 and 8.

This invention relates to the suspension of particles such as pigments and the like particularly for the purpose of providing coating compositions such as paints. The compositions of the present invention have superior characteristics as coating compositions due to the presence therein of particular rheological-properties modifying agents, that is agents which provide superior suspensions of the pigments and which give the coating compositions the ability to cover both porous and non-porous surfaces. The improved rheological-properties are obtained by the use in the compositions of this invention of copolymers of ethylene and an organic acid, particularly an unsaturated organic acid such as acrylic acid, which copolymer contains free carboxyl groups, as a rheological-property modifying and suspending agent. This agent and the finely divided solid particles, such as the pigment, are dispersed in an organic liquid vehicle compatible with the solid particles.

Rheological-property modifying and suspending agents have been used for many years to try to improve the properties of suspensions, and particularly suspensions of pigments which are used in paints and the like. However, the known agents have all suffered from various defects. Thus, for example, aluminum stearate is deficient in its ability to maintain pigments in suspension in most organic vehicles and also in cases wherein the pigments must be redispersed after settling from such suspensions during long periods of aging. The gel produced by the incorporation of aluminum stearate in organic vehicles is of a rubbery type, rather than the desirable thixotropic type of gel which is effective in obtaining stable suspensions. Furthermore, aluminum stearate has no beneficial effect on the brushability properties of pigment suspensions.

Organic derivatives of montmorillonite have also been used alone as suspending agents, but have been found to be effective only in the presence of aromatic and polar solvents and are inefficient when incorporated in the aliphatic hydrocarbon vehicles, which are more favorable because of their lack of odor.

While hydrogenated castor oil is a more efficient suspending agent than the organic derivatives of montmorillonite, and is suitable for use with aliphatic hydrocarbon vehicles, it suffers from the disadvantage of being unstable at the elevated temperatures used in the processing of the suspensions, e.g. in paint mills, with the result that seeding or the formation of small grains in the suspensions occur. This lack of smoothness is highly undesirable in most suspensions, including those used in the protective coating and ink fields.

Polyethylene waxes, including emulsifiable polyethylene waxes and modified emulsifiable polyethylene waxes, have been used as suspending agents, and while these agents are better than many of the other agents, they also suffer from disadvantages. Paints containing polyethylene wax as suspending agent are characterized by a settling of the pigment contained therein within a few days, thus exhibiting a poor anti-sag property during the initial milling of the paint constituents, or "puff," which is the blown up appearance of paint indicative of a good dispersion, and resembling whipped cream in appearance. Furthermore, paints made with polyethylene waxes as suspending agents exhibit a defective "strike through." The term "strike through" refers to the ability of the paint pigment to cover porous as well as non-porous surfaces. In other words, paints containing polyethylene wax as suspending agents do not have a satisfactory ability to cover porous surfaces as well as non-porous surfaces.

It is accordingly a primary object of the present invention to provide particle suspension composition containing special rheological-property modifying and suspending agents which provide for heat stable compositions, which can tolerate water, which have superior brushing and anti-sag properties, which do not suffer from defective "strike through," which have satisfactory gloss and which also have superior enamel viscosity.

It is yet another object of the present invention to provide paint compositions of pigment and organic liquid vehicle plus the new suspending agents of this invention, which compositions have all of the superior properties indicated above.

Other objects and advantages of the present invention will be apparent from a further reading of the specification and of the appended claims.

With the above and other objects in view, the present invention mainly comprises a heat-stable composition which when mixed with organic liquid vehicles containing finely divided solid particles such as paint pigments has the property of modifying the rheological and suspension properties thereof, said compositions consisting essentially of an organic liquid compatible with said finely divided particles and the organic liquid containing the same and having dispersed therein a copolymer of ethylene and an unsaturated organic acid, said copolymer containing free carboxyl groups and having an acid number of between about 2 and 75, a molecular weight of between about 1000 and 8000, a softening point between about 205° F. and 240° F., and having a penetration hardness of between about 1 and 8.

The copolymers which are used according to the present invention are copolymers of ethylene and a lower unsaturated organic acid such as acrylic acid, methacrylic acid, vinylacetic acid, fumaric acid, maleic acid, etc.

The most preferred copolymer for the purposes of the present invention is the commercially sold product of Allied Chemical known as A–C Copolymer 540 which has the following typical analysis:

Hardness, 100 g./5 sec./77° F. in dmm.—2
Softening point (ASTM E–28)—226° F. (107° C.)
Cloud point—176° F. (80° C.)
Viscosity at 234° F. (140° C.) in cps.—560
Density—0.93
Acid number—40
Molecular wt.—3500–4000

These copolymers are effective at very low concentrations, as low as 1 lb. thereof per 100 gallons of total composition providing satisfactory improvement in rheological-properties. Of course much higher amounts can be used and are used according to the present invention, the maximum amount mainly being limited by commercial considerations. Thus, for commercial reasons it is not necessary to use amounts greater than about 30 pounds per 100 gallons of total composition.

Since the present invention is of primary significance in the paint industry and in providing paint compositions, the further discussion which follows will generally refer to paint vehicles, that is suspensions of pigments in an organic liquid carrier. It is to be understood, however, that the invention is also applicable to other particle suspensions than those used in the manufacture of paints.

As organic liquid there may be used for the purposes of the present invention all organic liquids compatible with both the polymer and the paint vehicle. Among the suitable hydrocarbons may be mentioned halogenated hydrocarbons; ketones, ethers and polyethers; esters, etheralcohols; alcohols and polyols. Typical suitable organic fluids include aliphatic, cycloaliphatic, aromatic, and terpene hydrocarbons, such as n-heptane, petroleum naphtha, mineral spirits, cyclohexane, benzene, toluene, p-xylene, cis-Decalin, tetralin, alpha-pinene, dipentene, and p-cymene; halogenated compounds, such as trichloroethylene, n-amyl chloride, perchloroethylene, 2-ethylhexyl chloride, chlorobenzene, o-chlorotoluene, o-dichlorobenzene, and dichloroethyl ether; ketones, such as acetone, methyl ethyl ketone, diethyl ketone, methyl n-propyl ketone, methyl i-butyl ketone, mesityl oxide, ethyl n-butyl ketone, diacetone alcohol, cyclohexanone, acetophenone, isophorone, and d-fenchone; ethers and polyethers, such as ethyl n-butyl ether, glycol diethyl ether, diethylene glycol diethyl ether, 1,4 dioxane, and tetrahydrofuran; esters, such as ethyl acetate, 1-butyl acetate, 2-methoxyethyl acetate, ethyl lactate, n-butyl lactate, diethyl oxalate, ethylene glycol diacetate, and gammavalerolactone; ether alcohols, such as 2-methoxyethanol, methoxymethoxyethanol, diethylene glycol monoethyl ether, and diethylene glycol monobutyl ether; and alcohols and polyols, such as ethyl alcohol, i-amyl alcohol, n-heptyl alcohols, di-i-butyl carbinol, methylphenyl carbinol, cyclohexanol, furfuryl alcohol; tetrahydrofurfuryl alcohol, benzyl alcohol, propylene glycol, 1,3-butanediol, and glycerol.

The amount of the organic liquid vehicle used in the formation of the dispersions can vary within rather wide limits, amounts of about 30 to 95% by weight, based on the weight of the dispersion being suitable.

The size of the solid particles can vary from colloidal to greater size, the main point being that the solid particles should be substantially insoluble in the medium in which they are suspended. There is no particular upper limit on particle size, but the size should be such that the particles are capable of being suspended in the selected medium. The solid particles may, as indictaed above, be pigments, and they may also be inerts, fillers, reflecting agents, etc.

The preferred technique for getting copolymer into finely divided form involves dispersing or dissolving the copolymer in the organic liquid vehicle at a temperature not exceeding the boiling point of the vehicle. If the copolymer is dissolved in the organic vehicle, it will then precipitate out as the vehicle is cooled with or without agitation. However any other technique for the preparation of the copolymer in finely divided form will yield a product which gives satisfactory results as a suspending agent. Good results are achieved when the indicated colloidal dispersion contains from about 10 to about 60% by weight of the copolymer and if the dispersion is agitated during the cooling period.

The paint compositions are prepared by incorporating the suspending agent into the paint or other vehicles system as part of the pigment or other solid particle grind. This preferred procedure is generally the most efficient and least expensive method for realizing the maximum benefits of the suspending agent. A grinding action is desirable primarily in order to achieve maximum separation of the suspending agent particles in the vehicle. When the particles are completely dispersed, then optimum effects are attained.

The amount of the suspending agent of course has an effect on the property of the final suspension, and in general, as indicated above, the amount should be about 1–30 lbs. of the copolymer to 100 gallons of the final paint product. The amount of copolymer in the vehicle in which the same is dispersed is preferably between about 3—75% by weight.

The following examples are given to further illustrate the present invention. The scope of the invention is not, however meant to be limited to the specific details of the examples.

EXAMPLE 1

A paint formulation is prepared as follows:

24 parts by weight of A–C 540 of the characteristics given above are heated in 76 parts by weight of mineral spirits to a temperature of 150° C. while stirring to obtain a uniform dispersion. The dispersion is then allowed to cool to room temperature while agitating so as to obtain a finely particulate dispersion of AC–540 in the mineral spirits.

210 lbs. of long oil soya alkyd (T&W 300–70) (70% N.V.), 40 lbs. of mineral spirits, 4 lbs. of calcium naphthenate drier and 6 lbs. of the above prepared dispersion of AC–540 in mineral spirits are slowly mixed for about 2 minutes.

There is then added thereto 500 lbs. of $TiO_2$ (Titanox RCHT–X) and 100 lbs. of $TiO_2$ (Titanox RA–45) and the stirring is continued at high speed for 20 minutes at 160° C.

There is then added 190 lbs. of the same long oil soya alkyd (70% N.V.) 158 lbs. of mineral spirits, 5 lbs. of lead naphthenate, 2 lbs. of cobalt naphthenate and 1 lb. of methyl ethyl ketoxime and the mixing is continued at slow speed for 5 minutes. This results in the production of 100 gallons of paint which upon testing is found to have the following characteristics.

Fineness of grind—6
Weight per gallon—11.8 lbs.
Viscosity—89 KU
Brush application—Good
Flow brushing—Good
Drying-set to touch—45 minutes
Drying dry hard—6 hours
Degree of gloss (dry 24 hrs.)—76
Gloss retention (dry 1 month)—50
Anti-sag index—10
Enamel hold-out index—4
Can appearance (1 month)—Good—very slightly yellow liquid on top The above composition provides several advantages which are apparent from the above test results, and which may be summarized as follows:

(1) The viscosity measured by a Stormer viscosimeter shows that the enamel containing the AC–540 has a viscosity which is 10 KU higher than a paint prepared of the same composition but containing an equal quantity of emulsifiable polyethylene wax instead of the AC–540. This means that visually the enamel appears heavier in consistency or body.

(2) The anti-sag index consisted of enamel drawdowns made with a Leneta anti-sag meter and the thickness reading at which sagging took place is the index reading. The composition of the present invention sagged at a 10 mil film thickness, whereas the same composition but substituting emulsifiable polyethylene wax for the AC–540 sagged at 5 mil film thickness. Thus, the composition of the present invention provides twice the anti-sag properties.

(3) The enamel holdout index was made with the Leneta anti-sag meter applying the enamel over a sealed and unprimed paper chart, Leneta form 1B Penopac Chart. The mil thickness at which no difference in film appearance and gloss is noted is shown as the index reading. The anti-sag properties found for the products of the present invention are very high.

EXAMPLE 2

A paint composition is prepared in the same manner as Example 1, of the following components, all parts being by weight

| | Parts |
|---|---|
| Long oil soya alkyd (Cargil BB-6-70) | 130 |
| Mineral spirits | 24 |
| 4% calcium napthenate | 4 |
| 24% AC-540 in mineral spirits | 8 |
| TiO₂ (Titanox RA-45) | 350 |
| Long oil soya alkyd (Cargil BB-6-70) | 400 |
| Mineral spirits | 140 |
| 6% cobalt napthenate drier | 2.3 |
| 24% lead napthenate drier | 6 |
| Methyl ethyl ketoxime | 1 |

Tests were carried out and the results are tabulated below:

Viscosity (KU)—83
Brushing (flow)—Good
Dry to touch—45 minutes
Dry hard—6 hours
Degree of gloss—95
Anti-sag index—10
Enamel hold-out index—3

While the invention has been described in particular in connection with certain formulations it is apparent that variations and modifications of the invention can be made without departing from the spirit or scope of the invention. Such variations and modifications are accordingly meant to be comprehended within the meaning and scope of equivalents of the appended claims.

What is claimed is:

1. Paint composition comprising an organic liquid film-forming vehicle, finely divided pigment dispersed in said vehicle, and a copolymer of ethylene and an unsaturated organic acid dispersed in said vehicle, said copolymer containing free carboxyl groups and having an acid number of between about 2 and 75, a molecular weight of between about 1000 and 8000, a softening point of between 205° F. and 240° F., and having penetration hardness of between about 1 and 8, said copolymer being present in an amount of about 1–30 lbs. per 100 gallons of total composition.

2. Composition according to claim 1 wherein said copolymer has the following analysis:

Hardness 100 g./5 sec./77° F. in dmm.—2
Softening point (ASTM E-28)—226° F. (107° C.)
Cloud point—175° F. (80° C.)
Viscosity at 234° F. (140° C.) in cps.—560
Density—0.93
Acid number—40
Molecular wt.—3500–4000

3. Composition according to claim 1, in which the unsaturated organic acid is acrylic, methacrylic, vinylacetic, fumaric or maleic acid.

References Cited

UNITED STATES PATENTS

| 2,977,334 | 3/1961 | Zopf. Jr. et al. | 260—27 |
| 3,008,847 | 11/1961 | Berge | 260—40 |
| 3,306,866 | 2/1967 | Percival | 260—29.6R |
| 3,389,104 | 6/1968 | Austin et al. | 260—40 |
| 3,404,134 | 5/1969 | Rees | 260—78.5 |

MORRIS LIEBMAN, Primary Examiner

S. L. FOX, Assistant Examiner

U.S. Cl. X.R.

252—352; 260—29.8, 31.2, 31.4, 32.8, 33.2, 33.4, 33.6, 33.8

PO-1050
(5/69)

UNITED STATES PATENT OFFICE
CERTIFICATE OF CORRECTION

Patent No. 3,557,037          Dated January 19, 19'

Inventor(s) George W. Collins and Frank A. Baron

It is certified that error appears in the above-identified and that said Letters Patent are hereby corrected as shown below Column 2, line 63, "Cloud point - 176°F." should read --Cloud point - 175°F.--.

Column 4, line 32, "160°C." should read --160°F.--.

Signed and sealed this 11th day of May 1971.

(SEAL)
Attest:

EDWARD M. FLETCHER, JR.
Attesting Officer

WILLIAM E. SCHUYLER,
Commissioner of Pate